United States Patent
Ershov et al.

(10) Patent No.: US 7,564,888 B2
(45) Date of Patent: Jul. 21, 2009

(54) HIGH POWER EXCIMER LASER WITH A PULSE STRETCHER

(75) Inventors: Alexander I. Ershov, San Diego, CA (US); James J. Ferrell, Temecula, CA (US); Thomas Hofmann, San Diego, CA (US); Daniel J. Reiley, San Diego, CA (US); Christopher R. Remen, San Diego, CA (US); Richard L. Sandstrom, Encinitas, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 11/805,583

(22) Filed: May 23, 2007

(65) Prior Publication Data

US 2007/0280308 A1 Dec. 6, 2007

Related U.S. Application Data

(63) Continuation-in-part of application No. 10/847,799, filed on May 18, 2004, now Pat. No. 7,369,597.

(60) Provisional application No. 60/811,242, filed on Jun. 5, 2006.

(51) Int. Cl.
H01S 3/22 (2006.01)
H01S 3/10 (2006.01)

(52) U.S. Cl. .............. 372/57; 372/25; 372/55; 372/58

(58) Field of Classification Search ........ 372/55, 372/57–58, 25

See application file for complete search history.

(56) References Cited

U.S. PATENT DOCUMENTS

| | | | |
|---|---|---|---|
| 6,067,311 A | 5/2000 | Morton et al. | 372/57 |
| 6,314,119 B1 | 11/2001 | Morton | 372/57 |
| 6,535,531 B1 | 3/2003 | Smith et al. | 372/25 |
| 6,571,057 B2* | 5/2003 | Aoki | 396/53 |
| 6,704,340 B2 | 3/2004 | Ershov et al. | 372/58 |
| 6,757,051 B2* | 6/2004 | Takahashi et al. | 355/67 |
| 7,009,140 B2 | 3/2006 | Partlo et al. | 219/121.65 |
| 7,035,012 B2* | 4/2006 | Govorkov et al. | 359/618 |
| 7,167,499 B2 | 1/2007 | Das et al. | 372/55 |
| 7,369,596 B2 | 5/2008 | Steiger et al. | 372/61 |
| 2002/0071115 A1* | 6/2002 | Batchelder | 356/237.1 |
| 2002/0154671 A1* | 10/2002 | Knowles et al. | 372/57 |
| 2003/0011755 A1* | 1/2003 | Omura et al. | 355/87 |
| 2003/0219056 A1* | 11/2003 | Yager et al. | 372/57 |
| 2004/0051984 A1* | 3/2004 | Oshino et al. | 359/845 |
| 2005/0157278 A1* | 7/2005 | Owa et al. | 355/30 |
| 2005/0259709 A1 | 11/2005 | Das et al. | 372/55 |
| 2007/0097511 A1 | 5/2007 | Das et al. | 359/618 |
| 2007/0278193 A1 | 12/2007 | Hofmann | 219/121.6 |
| 2007/0279747 A1 | 12/2007 | Hofmann | 359/583 |

* cited by examiner

*Primary Examiner*—Minsun Harvey
*Assistant Examiner*—Phillip Nguyen

(57) ABSTRACT

An apparatus and method is disclosed which may comprise a high power excimer or molecular fluorine gas discharge laser DUV light source system which may comprise: a pulse stretcher which may comprise: an optical delay path mirror, an optical delay path mirror gas purging assembly which may comprise: a purging gas supply system directing purging gas across a face of the optical delay line mirror. The optical delay path mirror may comprise a plurality of optical delay path mirrors; the purging gas supply system may direct purging gas across a face of each of the plurality of optical delay line mirrors. The purging gas supply system may comprise: a purging gas supply line; a purging gas distributing and directing mechanism which may direct purging gas across the face of the respective optical delay path mirror.

9 Claims, 9 Drawing Sheets

HIGH POWER EXCIMER LASER WITH A PULSE STRETCHER

CROSS-REFERENCE TO RELATED APPLICATIONS

The present application is a continuation-in-part of U.S. patent application Ser. No. 10/847,799, filed on May 18, 2004, entitled LASER OUTPUT LIGHT PULSE STRETCHER, published on May 19, 2005, Pub. No. US 2005/0105579, and claims priority to U.S. Patent Application Ser. No. 60/811,242, filed on Jun. 5, 2006 and is related to U.S. Pat. No. 7,016,388 entitled LONG DELAY AND HIGH TiS PULSE STRETCHER and is related to U.S. Pat. No. 6,067,311, entitled EXCIMER LASER WITH PULSE MULTIPLIER, issued to Morton et al. on May 23, 2000, and U.S. Pat. No. 6,314,119, entitled EXCIMER LASER WITH PULSE AND BEAM MULTIPLIER, issued to Morton on Nov. 6, 2001, and U.S. Pat. No. 6,535,531, entitled GAS DISCHARGE LASER WITH PULSE MULTIPLIER, issued to Smith et al. on Mar. 18, 2003, and U.S. Pat. No. 6,704,340, entitled LITHOGRAPHY LASER SYSTEM WITH IN-PLACE ALIGNMENT TOOL, issued to Ershov et al. on Mar. 9, 2004, the disclosures of all of which are hereby incorporated by reference.

The present application is also related to co-filed applications copending, co-owned U.S. patent application Ser. No. 11/447,379 entitled, "DEVICE AND METHOD TO CREATE A LOW DIVERGENCE, HIGH POWER LASER BEAM FOR MATERIAL PROCESSING APPLICATIONS" by Hofmann, filed concurrently herewith, and to copending, co-owned U.S. patent application Ser. No. 11/447,380 entitled, "DEVICE AND METHOD TO STABILIZE BEAM SHAPE AND SYMMETRY FOR HIGH ENERGY PULSED LASER APPLICATIONS" by Hofmann, filed concurrently herewith, and to copending, co-owned U.S. patent application Ser. No. 11/447,502 entitled, "CHAMBER FOR A HIGH ENERGY EXCIMER LASER SOURCE" by Steiger et al., filed concurrently herewith, the disclosures of each of which are hereby incorporated by reference herein.

FIELD OF THE DISCLOSED SUBJECT MATTER

The disclosed subject matter related to laser systems such as those used as an integrated circuit manufacture photolithography DUV light source or for laser surface treatment, e.g., annealing of amorphous silicon to make crystallized substrates for manufacturing, e.g. for making thin film transistors for thin film displays.

BACKGROUND

Excimer laser systems, e.g., single chamber laser systems with pulse stretchers, e.g., applicants' assignee's 7XXX model laser system series and XLA-XXX (MOPA) multi-chamber laser systems utilize pulse stretchers which applicants' assignee refers to as an Optical Pulse Stretchers ("OPuS"). Applicants have found that for certain uses, e.g., for low temperature poly-silicon processing ("LTPS") high power elongated beam laser annealing or for tightly constricted laser beam characteristics and qualities, such as the very narrow bandwidth, high repetition rate and very restricted pulse variation, e.g., for use in currently employed integrated circuit manufacturing tool employing such laser systems for exposing wafers in such a process, the pulse stretchers can be improved according to aspects of embodiments of the disclosed subject matter.

SUMMARY

An apparatus and method is disclosed which may comprise a high power excimer or molecular fluorine gas discharge laser DUV light source system which may comprise: a pulse stretcher which may comprise: an optical delay path mirror, an optical delay path mirror gas purging assembly which may comprise: a purging gas supply system directing purging gas across a face of the optical delay line mirror. The optical delay path mirror may comprise a plurality of optical delay path mirrors; the purging gas supply system may direct purging gas across the face of each of the plurality of optical delay line mirrors. The purging gas supply system may comprise: a purging gas supply line; a purging gas distributing and directing mechanism which may direct purging gas across the face of the respective optical delay path mirror. The purging gas supply system may comprise: a purging gas supply line; a purging gas distribution manifold and a baffle arrangement directing purging gas across the face of the respective optical delay path mirror. The baffle may comprise a light transmitting opening exposing a respective optical delay path mirror to a light beam in the delay path. The distribution manifold may comprise: a top plate and a bottom plate forming internal channels when joined together connecting a purging gas inlet plenum to gas manifold gas distribution openings. The apparatus and method may comprise: a mirror position adjustment mechanism adjusting the position of an optical delay path mirror to correct for errors in the alignment of the optical delay path. The mirror position adjustment mechanism may comprise: an optical delay path mirror mount moveably connected to an optical delay path housing wall for movement of the optical delay path mirror relative to the optical delay path.

DETAILED DESCRIPTION

According to aspects of an embodiment of the disclosed subject matter a adjustable mirror or mirrors, e.g., in an adjustable mirror tower, e.g., for an OPuS is proposed, e.g., using a method to provide axial adjustment to the mirror(s)/mirror tower(s)/mirror mount(s), e.g., in one housing, e.g., the lower housing of the OPuS tower, or, alternatively in both towers, in order to better align the output of the OPus to the portion(s) of the laser output light pulse beam that is not transitioned into the delay path of the OPuS pulse stretcher. According to aspects of an embodiment of the disclosed subject matter an axial adjustment can also provide a method to focus the mirror system, e.g., to compensate for variation in mirror radius curvature. The adjustment can also be made accessible from the outside of the mirror housing in either or both of the OPuS mirror towers. The adjusting range could be, e.g., about ±8.0 mm minimum or ±10.0 mm nominally from its nominal position.

While the same techniques as noted in the present application could be utilized to adjust, e.g., the axial positioning of both the OPuS tower lower housing mirrors and upper housing mirrors, applicants have decided that according to aspects of an embodiment of the disclosed subject matter, only the mirrors in the lower housing need be adjustable, and still accomplish, among other things, the above noted benefits. Such is illustrated according to aspects of an embodiment of the disclosed subject matter shown in the accompanying Figures.

Figure 1:
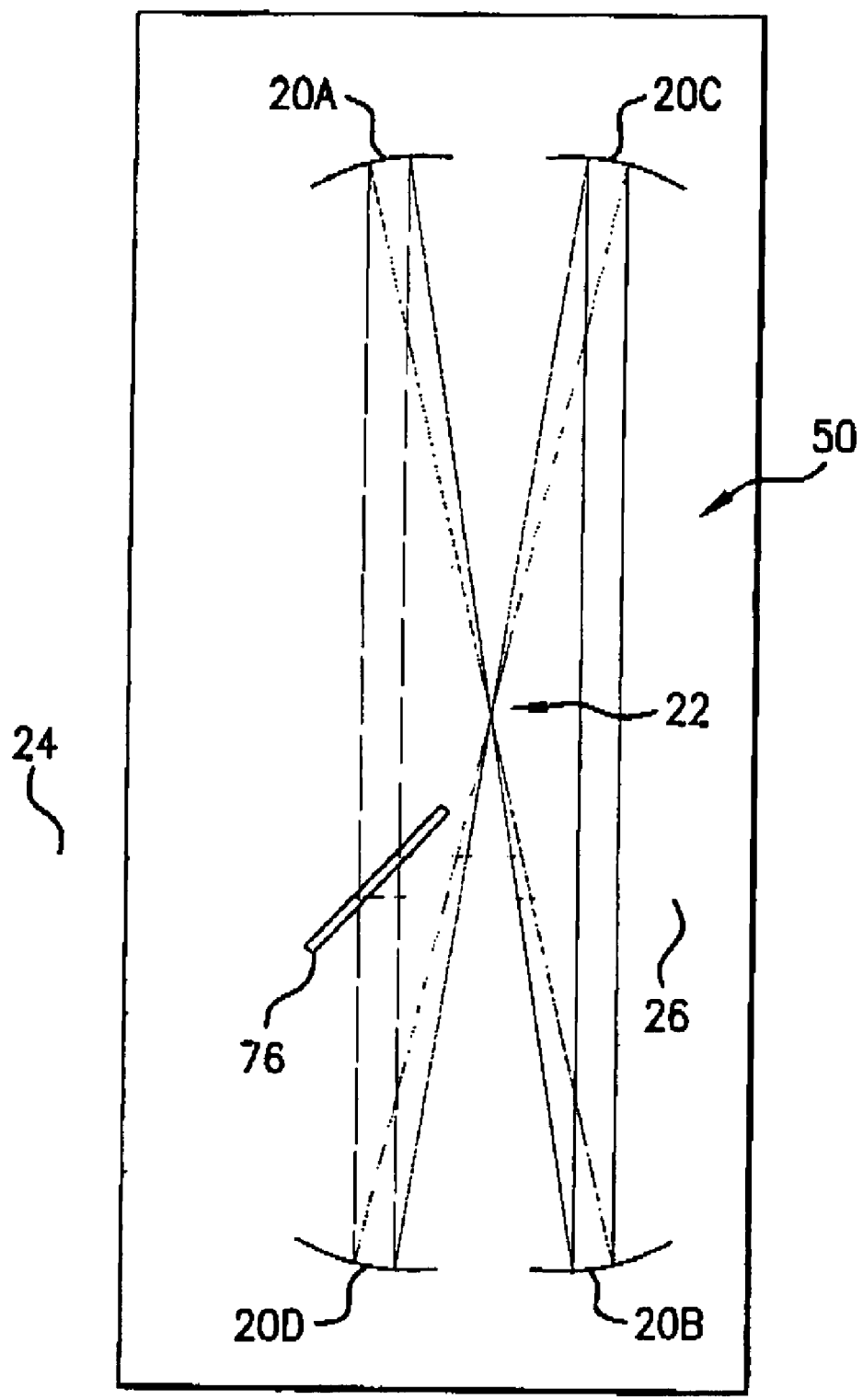
FIG. 1 shows an illustration in schematic form of a pulse stretcher according to aspects of an embodiment of the disclosed subject matter.

Turning to FIG. 1 there is illustrated schematically a four mirror pulse stretcher (OPuS) of the type used in applicants' assignees laser systems as noted above, which may be contained in a housing as schematically illustrated in FIG. 1 at 50. As illustrated the laser system output laser light pulse beam 24 can enter the pulse stretcher and encounter a beam splitter 76 contained, e.g., in a beam splitter housing 70 shown by way of example in FIG. 2 and, e.g., be reflected to mirror 20A and from there to mirror 20B and to mirror 20C and then to mirror 20D and back to the beam splitter to form a delay path output 26, which may be the output of the entire beam pulse stretcher or enter into a second beam splitter (not shown in FIG. 1) and into a second delay path, e.g., with an additional four mirrors (not shown in FIG. 1).

Figure 2:
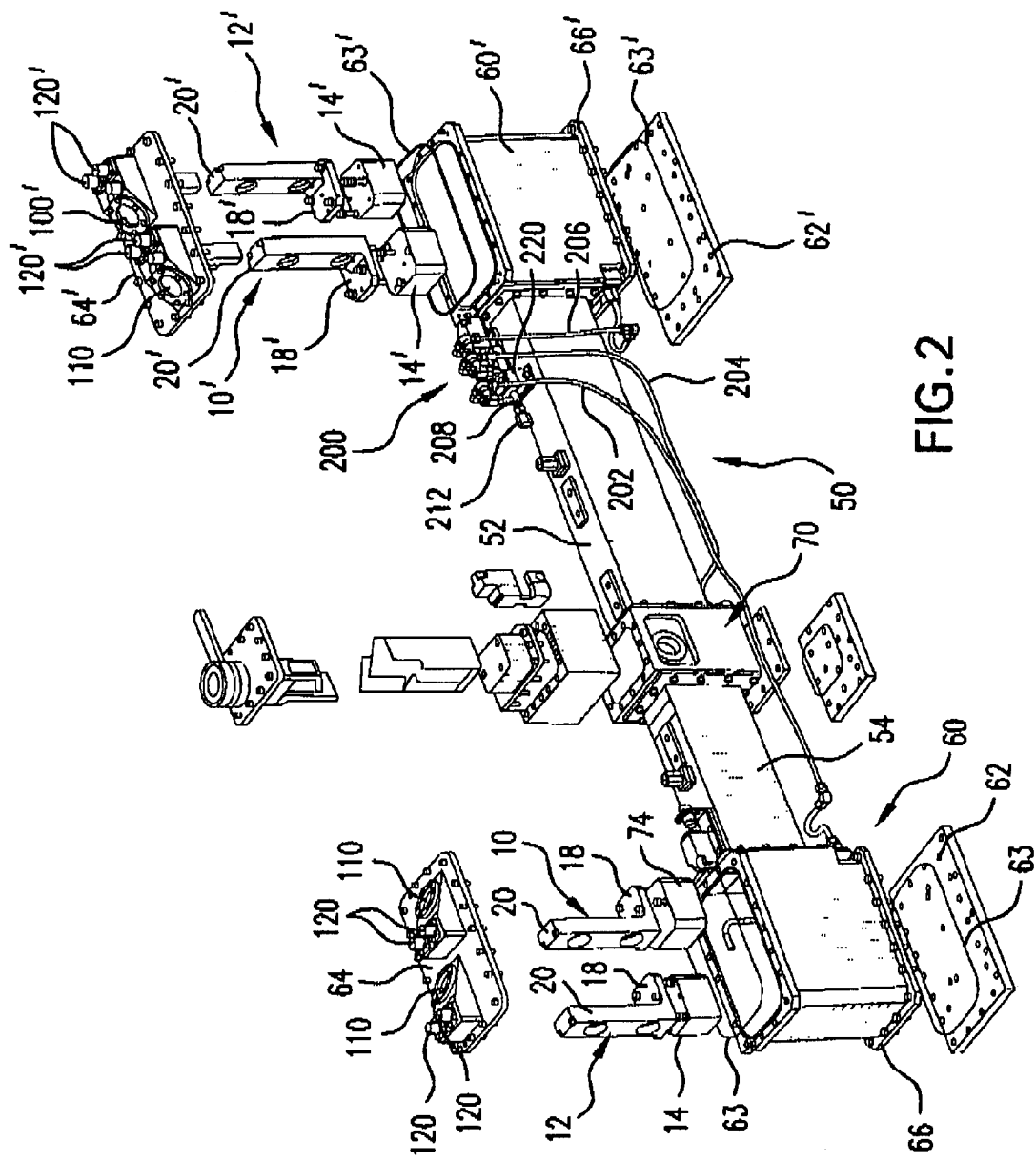
FIG. 2 shows a perspective exploded view of a pulse stretcher tower including mirror housings and a beam splitter housing and enclosure tubes according to aspects of an embodiment of the disclosed subject matter.

As illustrated in FIG. 2 an OPuS 50 may have the beam splitter housing 70 in the between an upper tower 52 and a lower tower 54, each forming an enclosure to provide, e.g., a nitrogen purge within the towers to avoid, among other things, absorption of the DUV light output from, e.g., an excimer or other gas discharge laser chamber. The pulse stretcher may have, e.g., a lower mirror housing 60 at the bottom of the lower tower 54 and a similar upper mirror housing 60' at the top of the upper tower 52.

Figure 3A:
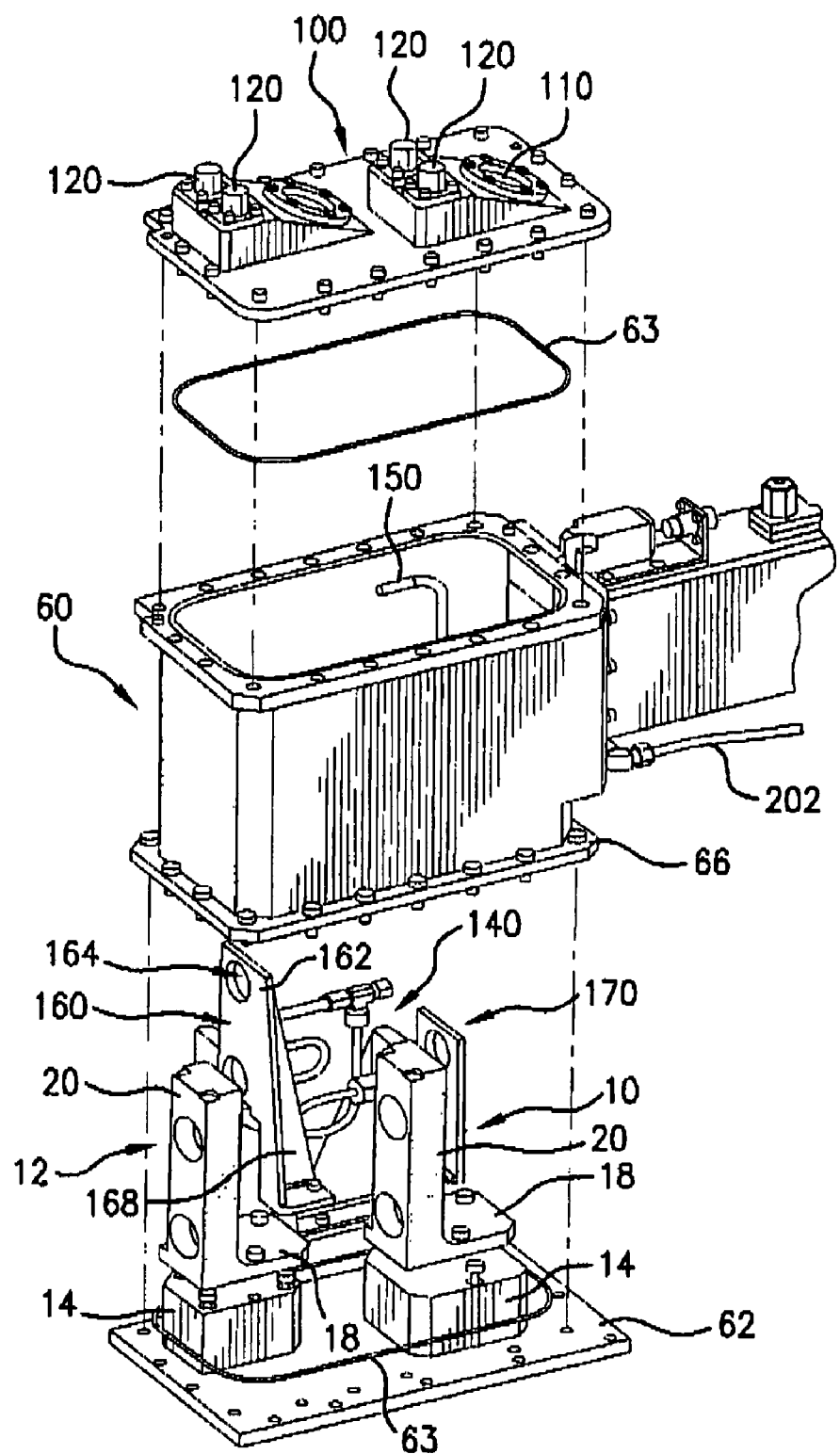
FIGS. 3A and 3B show exploded perspective views of aspects of an embodiment of the disclosed subject matter.

Turning now to FIG. 1, and in more detail in FIGS. 3A and B, there is shown in more detail an example of a lower housing 60 and its contents and an upper housing 60' and its contents according to aspects of an embodiment of the disclosed subject matter. Short delay path mirror mounts 10, 10' and a long delay path mirror mounts 12, 12' can be seen. The long delay path mirror mount 12, may house mirrors, e.g., mirrors 20B and 20D, e.g., from a first pulse stretcher and long delay path mirror mount 12' may hold mirrors 20A, 20C from that first pulse stretcher and the mirror mounts 10 in the lower pulse stretcher housing 60 and 10' in the upper housing 60' may similarly carry the mirrors 20B and 20D and mirrors 20A and 20C respectively for a second pulse stretcher which may be seen to have a shorter delay path (not shown in FIG. 1).

Figure 3B:
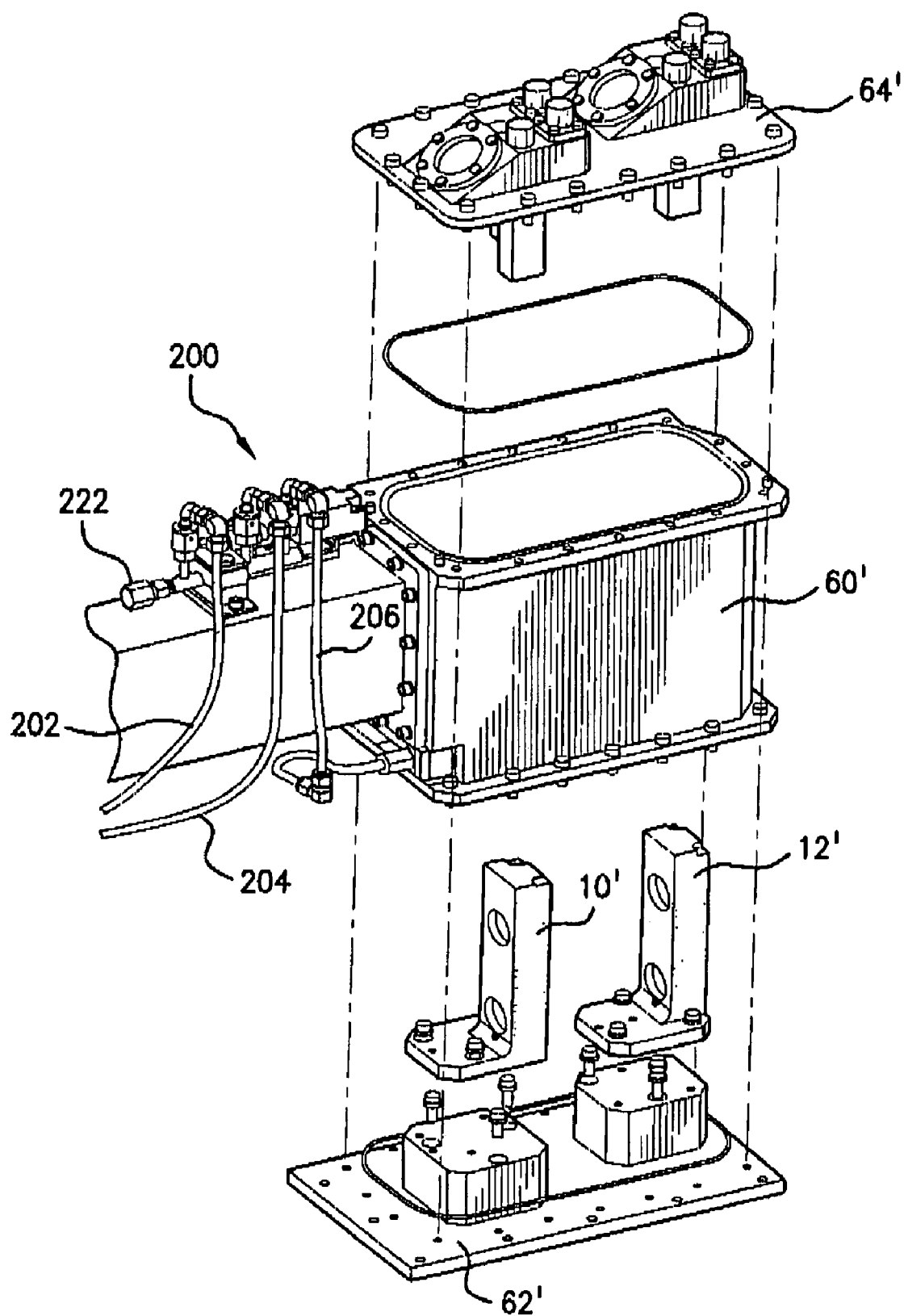
Figure 4A:
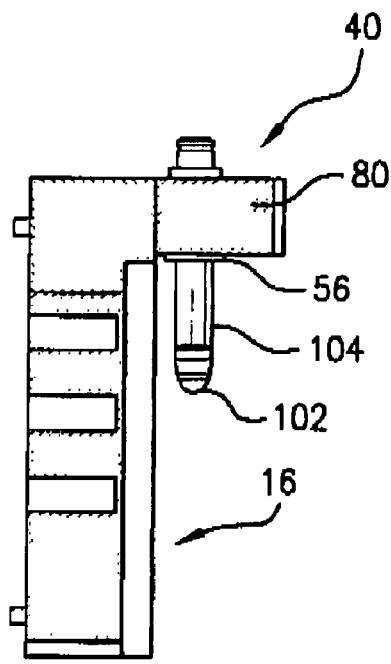
FIGS. 4A, 4B and 4C show a side view and perspective views, respectively, of a mirror housing body position adjustment mechanism according to aspects of an embodiment of the disclosed subject matter.
Figure 4B:
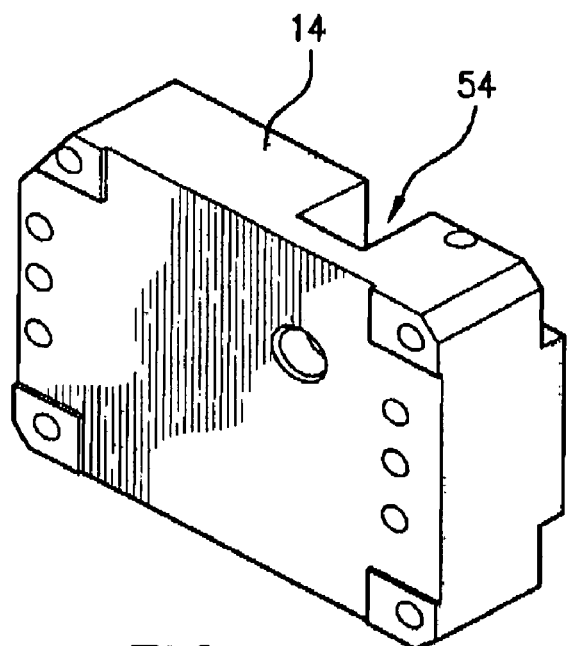
Figure 5:
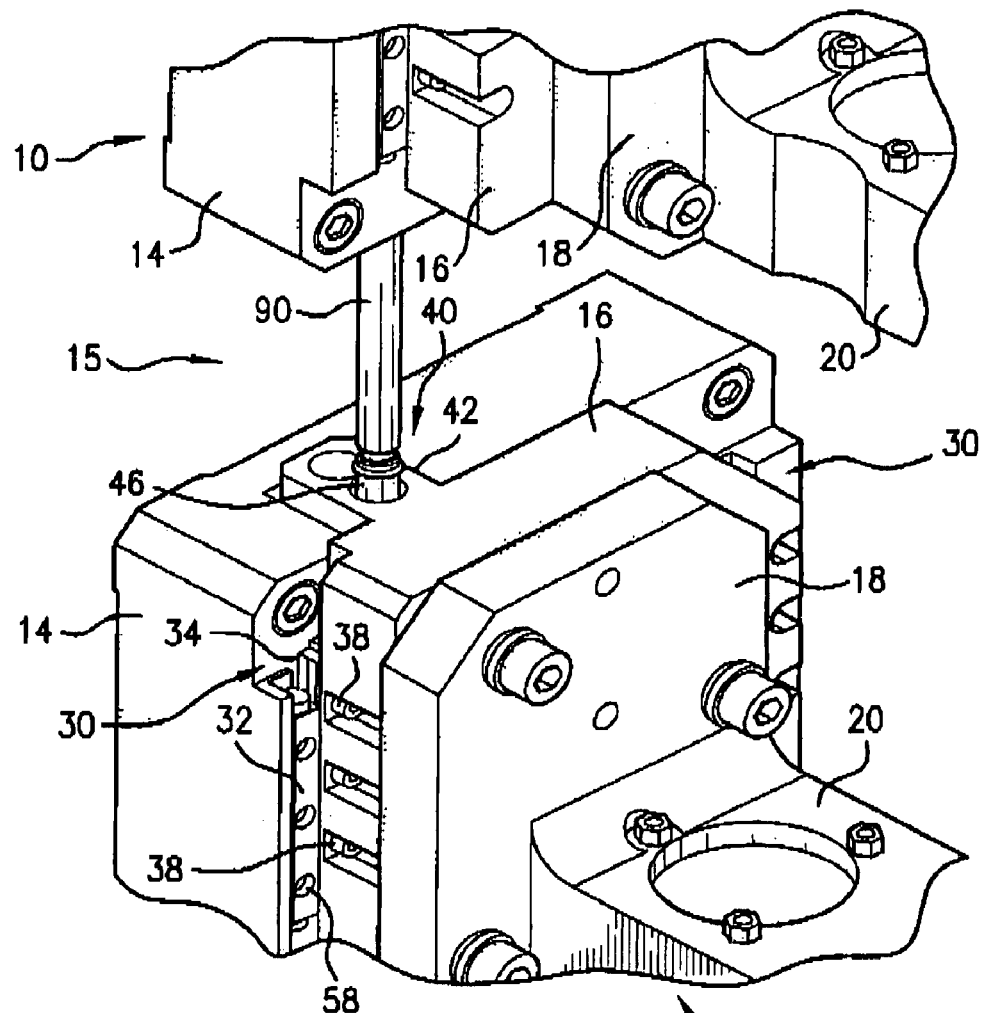
FIG. 5 shows a perspective view of a mirror position adjustment assembly according to aspects of an embodiment of the disclosed subject matter.
Figure 6:
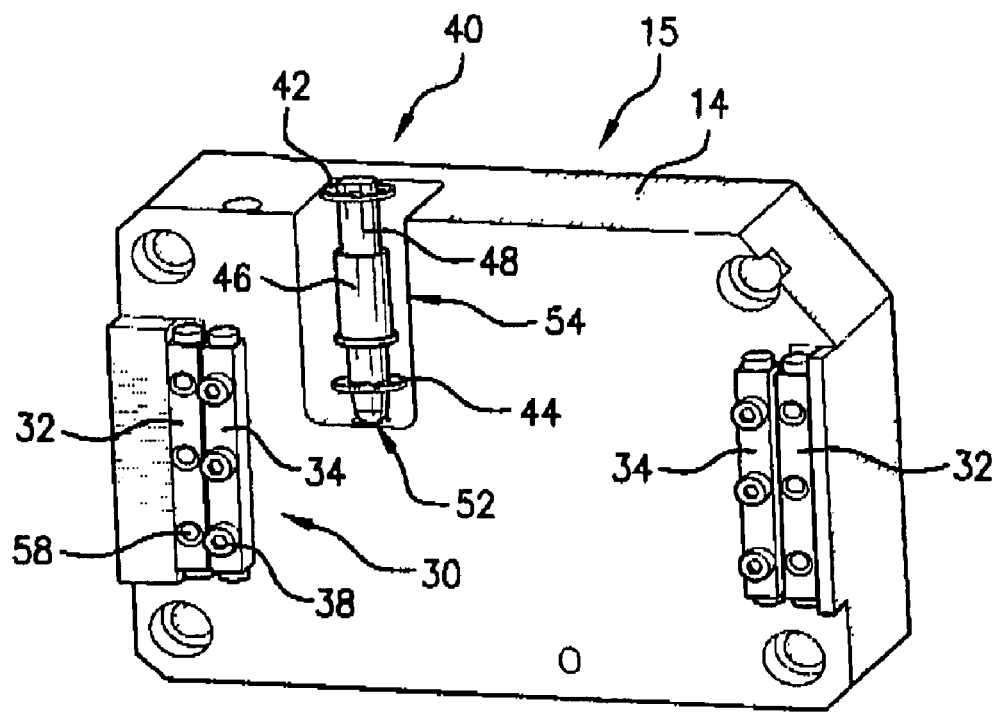
FIG. 6 shows a perspective view of a mirror position adjustment mechanism according to aspects of an embodiment of the disclosed subject matter.

Each of the mirror mounting assemblies 10, 12 and 10' 12' may include a mirror mounting block 14, 14', a mirror position adjustment carriage 16 (shown in FIGS. 4A, 5 and 6) a mirror mounting plate 18 and a mirror mount extension 20, which can house the respective pair of mirrors in the illustrated mirror receiving openings 26. The mirror extension 20, containing, e.g., the lower mirrors 20B, 20D for one of, e.g., two optical delay lines for which the two bottom mirrors are contained in the lower mirror housing 60, may be attached to the mirror mounting block 14 by the mirror extension mounting plate 18, directly, as shown in FIGS. 2 and 3A and 3B, or indirectly through the mirror adjustment carriage 16, as illustrated in FIGS. 4A, 5 and 6, e.g. using screws, some of which are illustrated in the Figures.

Figure 10:
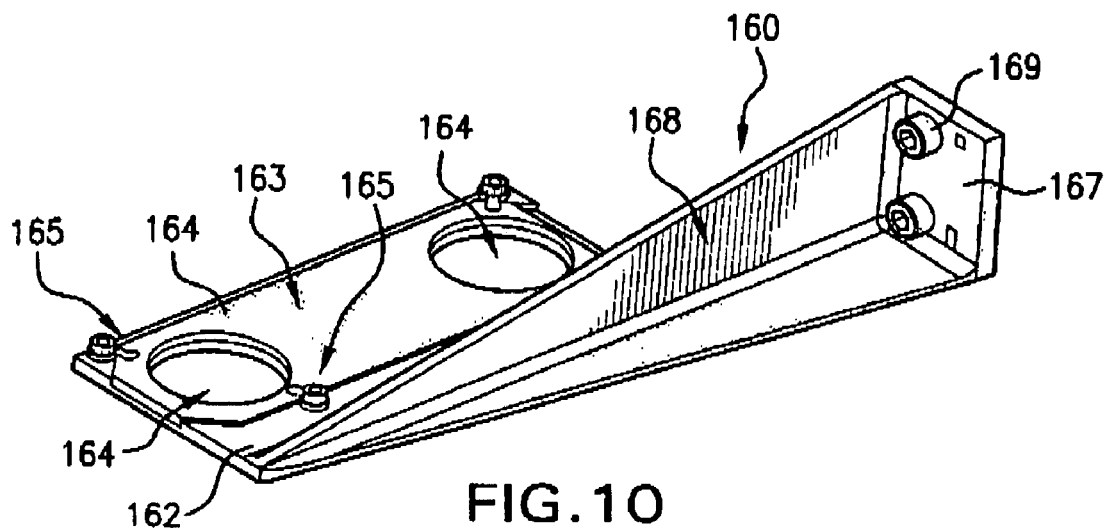
FIG. 10 shows a perspective view of another aspect of the gas distribution assembly according to aspects of an embodiment of the disclosed subject matter.
Figure 9:
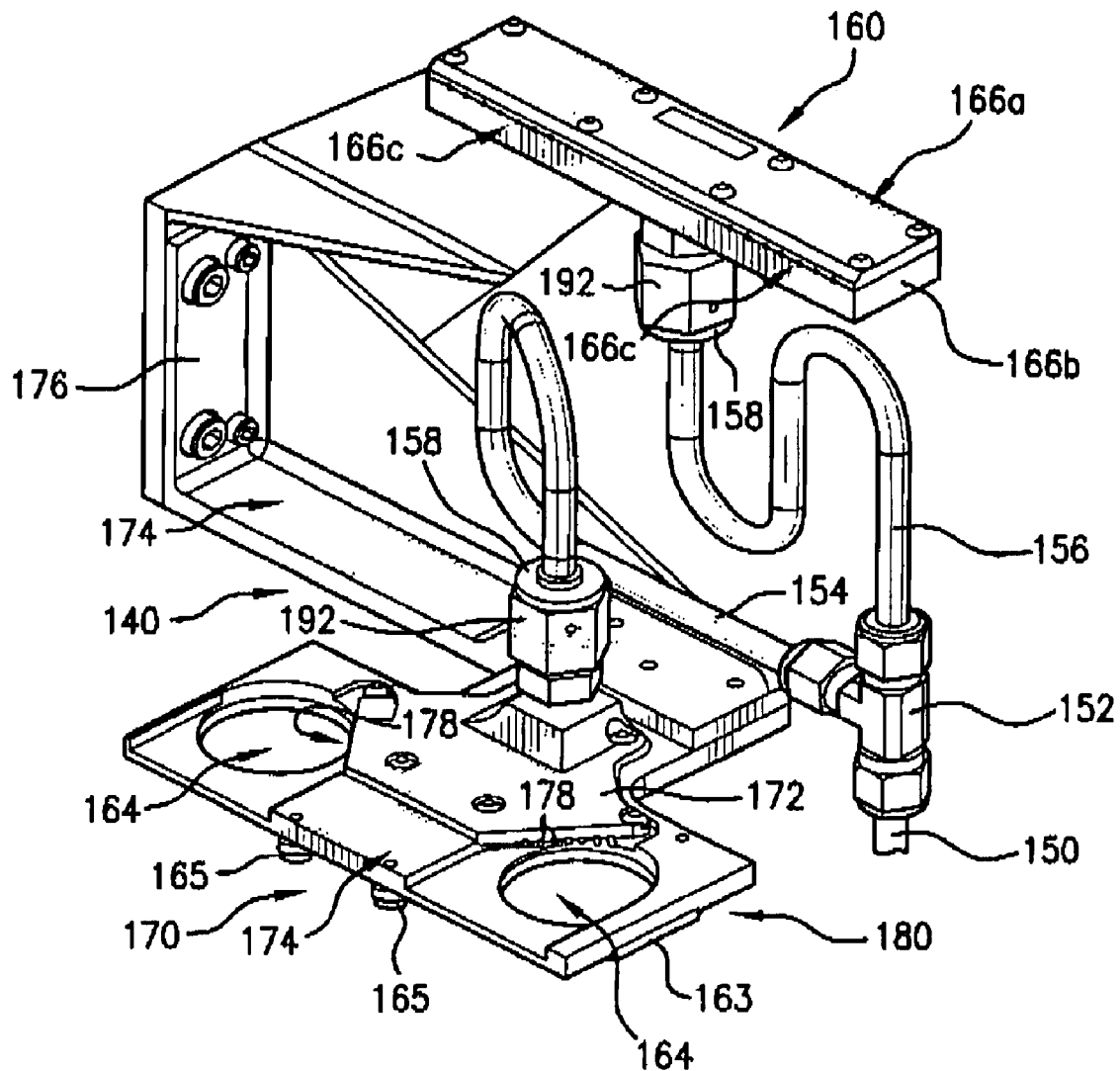
FIG. 9 shows a perspective view of a mirror gas distribution assembly according to aspects of an embodiment of the disclosed subject matter.

FIG. 3A illustrates in an expanded view a lower housing 60 and its contents embodying, among other things, a mirror gas purging assembly 140, also shown in an expanded view in FIGS. 9 and 10. The lower housing 60 shown in FIG. 3A differs from that of FIG. 2 in that it contains the mirror gas purging assembly 140. the upper housing 60' shown in a more expanded view in FIG. 3B is more or less the same as the upper housing 60' in FIG. 2, though, as noted above, it too could have the same or substantially the same mirror gas purging assembly 140 as shown in FIG. 3A and FIG. 9.

As can be seen in FIGS. 3A and 9 a mirror purge assembly 140, by way of example may include, e.g., a gas inlet line 150, which may be connected to the lower housing gas purge line 202, through the wall of the housing 60. The mirror purge assembly 140 may have a lower mirror extension 12 gas purge assembly 160 and an upper mirror mount extension 10 gas purge assembly 170. The mirror purge gas inlet 150 may be connected through a T-fitting 152 to an upper mirror mount purge gas line 154 and a lower mirror mount purge gas line 156. The upper mirror mount purge gas line 154 and a lower mirror mount purge gas line 156 may each be connected to the respective purge gas manifolds 166a,b and 170 through a high pressure gasket assembly 158, rated, e.g., for over 600 kPa of $N_2$ pressure. Shown in FIG. 10, by way of example, a lower mirror gas purge baffle assembly 160, may include, e.g., a lower mirror gas purge baffle plate 162, into an opening in which may be inserted a pyrex glass plate 163. The pyrex plate 163 may include a pair of openings 164 to allow passage of the light beam in the first delay path of the pulse stretcher to reach the respective mirrors 20D and 20B in that first delay path, e.g., shown schematically in FIG. 1. The pyrex glass plate 163 may be held in place in its opening in the purge plate 162 by a plurality of spring clips 165. The Pyrex plate 163 may be used, e.g., for an alignment aid. During alignment of the OPuS mirrors, the beam may move out of the beam path, which may, e.g., make it hard to see on bare metal. The Pyrex plate, being placed completely around the mirror hole openings, can fluoresce when impinged with UV light. A technician will then be able to see where the beam is at, allowing the repositioning of the beam correctly onto the mirrors.

Purge gas, e.g., nitrogen, may be directed to internal passages (not shown) in the manifold formed by manifold bottom plate 166a, and manifold top plate 166b, from the gas inlet line 156, and flow to manifold outlet openings 166c (shown in FIG. 9). The lower purge gas manifold plates 166a and 166b may be held together by suitable screws. The baffle plate 163 may be held in place to direct purge gas across the faces of the mirrors in the mirror mount extension 12 by a bracket 168, which may include a bracket mounting plate 167, attached to the wall of the housing 60 by mounting screws 169. As shown in FIG 10.

An upper mirror purge baffle assembly 170 may include a lower baffle plate 172 and an upper baffle plate 174, which may have internal channels (not shown) leading from a plenum (not shown) connected to a gas fitting 192 to openings 178. The purge gas leaving the openings 178, similar to the gas leaving openings 166c in the lower mirror gas purge assembly, may be directed across the face of the mirrors, e.g., lower tower mirrors 20D and 20B, in a second delay path (not shown in FIG. 1). This improves the purging of hot gases accumulating near the mirror surfaces due to optical heating from the DUV light passing through the optical delay paths of the pulse stretcher 50.

A mirror position adjustment mechanism 15 may be incorporated into the pulse stretcher 50, in either of the housings 60, 60' or in both. The mirror position adjustment mechanism may include, illustratively, a mirror position adjustment carriage 16. The carriage 16, seen in more detail in FIGS. 4A and 5, as can be seen from FIG. 5 may be inserted between mounting plate 18 and mounting block 14. The adjustment carriage may be connected to the mounting plate 14 by crossed roller rail mounting 30, which may include, e.g., a roller assembly (rollers not shown) attached to the block 14 and a slot assembly 34 connected to the carriage, such that the carriage 16, with its attached mirror mount plate 18 and attached mirror mount extension 20 can move in the slot of the slot mechanism 34, as shown in FIG. 5, parallel to the surface of the mounting block 14, to thereby adjust the radial separation of the mirrors, e.g., mirrors 20D and 20B in the bottom housing 60 of the pulse stretcher 50 for respectively the first or second delay path of the pulse stretcher 50.

Figure 4C:
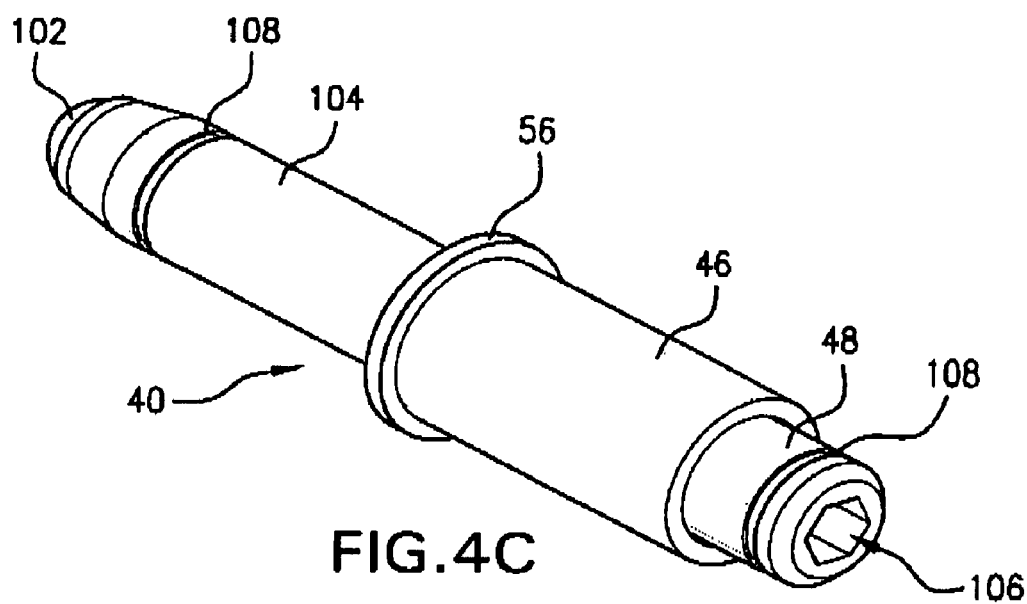
Figure 8:
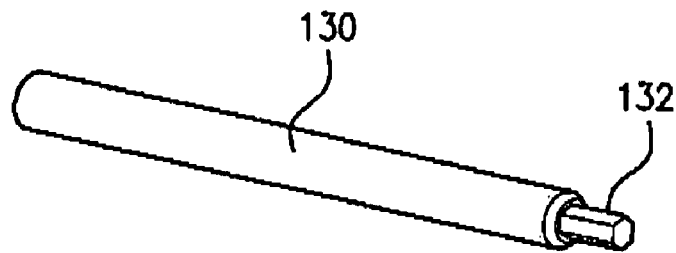
FIG. 8 shows a perspective view of a mirror positioning tool according to aspects of an embodiment of the disclosed subject matter.

As can be seen in more detail in FIG. 4C, FIG. 5 and FIG. 6, an adjustment mechanism adjusting set screw 40 may be employed. The set screw 40 may include, by way of example, an internally threaded sleeve (threads not shown) into which a threaded shaft having a threaded portion 48 (threads not shown) and an unthreaded portion 104 extending through the sleeve 56. The sleeve 46 may also have a retaining flange 56. locking washer slots 108 may serve to hold in place an upper locking washer 42 and a lower locking washer 44. the upper locking washer 42 along with the retaining flange 56 may serve to hold the adjustment set screw 40 in place in an extension 80 from the adjustment carriage 19, which extends into an opening in the mounting block 14 as illustrated in FIG. 5 and in partially cutaway form in FIG. 6. A ball tip 102 on the adjustment set screw 40 may interact with a dimpled ball tip receiving mechanism at the bottom of the insert opening 54 in the mounting block 14, as illustrated by way of example in FIG. 6. The adjustment set screw may be manipulated, utilizing a wrench nut 106, to rotate within the threaded collar 46, to thereby lengthen or shorten the extension of the shaft 104 and thus move the adjustment carriage relative to the housing wall 60, 60', to which the mounting block 14 is attached and thus moving the respective mirror mount extension and the respective two mirrors toward or away from the pulse stretcher housing at the other end of the pulse stretcher 50. The wrench nut 132 may cooperate with a tool, e.g., as shown in FIG. 8, which may have a shaft 130 and a matching wrench connector 132. alternatively, it may have an allen wrench connection. This tool may extend through a suitably sealed opening in the housing, e.g., housing 60 and directly interact with an adjustment set screw, e.g., in the mirror mount assembly 12, shown partially in FIG. 5, or in the case of the lower mirror mount assembly 12, also shown partially in FIG. 5, through an intermediate tool 90, which may extend through an opening in the mounting block 14 of the upper mirror mounting assembly 10 and engage the adjustment set screw for the lower mirror mounting assembly 12.

Thus, with adjustment carriage 16 attached for relative movement with respect to the respective mirror mounting plate 14, e.g., by the crossed roller rail sets 32, 34, which may comprise by way of example an NB-X000 rail set, made by DelTron. The rail sets 32, 34 allow for the radial adjustment carriage 16 to move with respect to respective mounting block 14 in a very controlled and aligned fashion, e.g., with an accuracy of alignment of around 2 microns (0.0008") over a travel of, e.g., about 4 inches. Screws 58 on the first guide rail 32 may attach to the mounting plate 14. The adjustment carriage 16 may also be connected to guide rail 34 by screws 38.

The upper holding washer 42 and lower holding washer 44 may each allow a threaded portion 46 of the adjustment mechanism 40 to spin in place when rotated, while, e.g., the sleeve 46 is held in place, also by the action of the upper holding washer 42 and the retaining flange 56. The rotation of the threads 46 serve to move a threaded sleeve 48 on the threaded portion 46, moving the sleeve up and down on the threaded portion 46. A ball end mounting 52 engaging a receptor in the floor of the position mechanism opening 54 in the mounting plate 14 moves the carriage 16 with respect to the plate 14.

Axial adjustment may be made using, e.g., a ¼-80 fine pitch adjustment screw portion 48 of the position adjustment mechanism 40. The rollers (not shown) of the crossed roller rail sets 32, 34 may be preloaded for zero "slop" and a rigid slide. The fine pitch adjustment screw with retaining washers 42, 44 may also serve to prevent the adjustment set screw 40 from being completely removed while installed. This can assure that if the unit is tightened too much the damage will occur in the adjustment set screw and not the optical assembly.

When an excimer or other gas discharge laser, e.g., operating in the DUV range, laser runs at high power (30W and higher), absorption of light by the OPuS mirrors can heat up these mirrors and the surrounding gas. This warm gas moves in the optical beam path and creates a non-uniform disturbance of the refractive index in the optical path. As a result, the beam propagating through this disturbed area suffers pointing change and increased divergence. As a result, the output beam can show splitting of its divergence profile.

Figure 7:
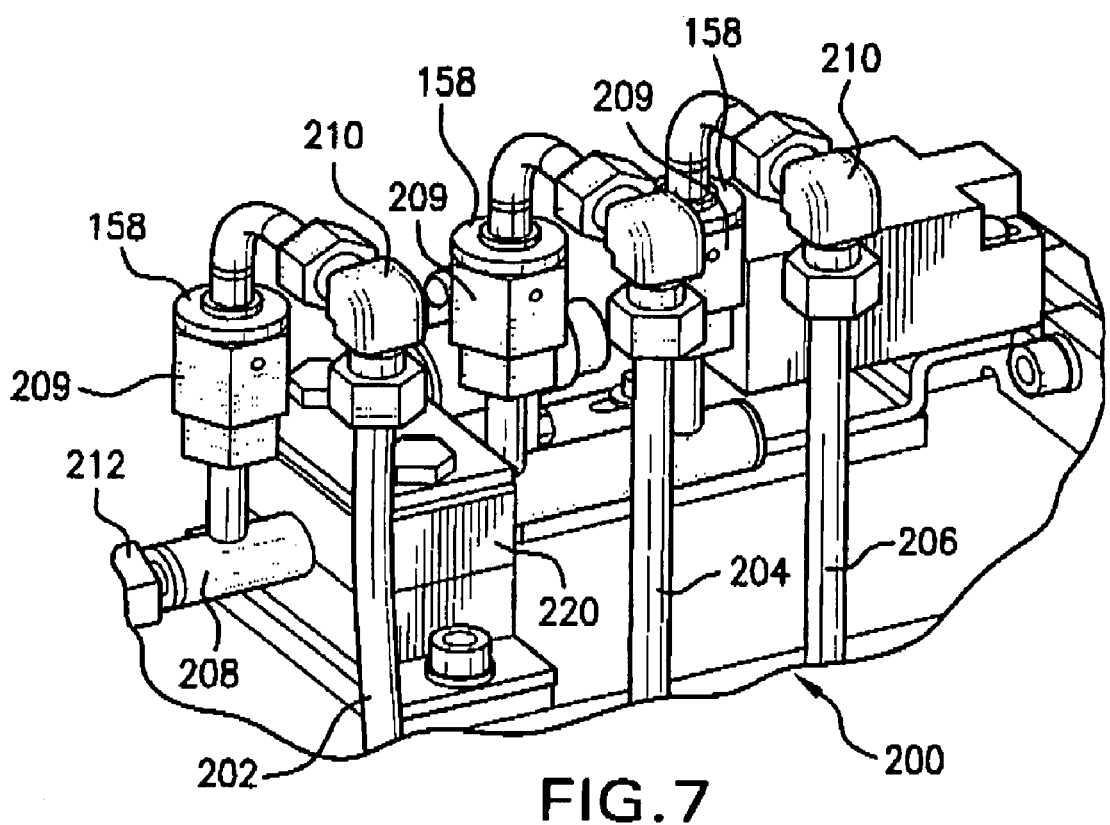
FIG. 7 shows a perspective view of a purge gas distribution manifold according to aspects of an embodiment of the disclosed subject matter.

According to aspects of an embodiment of the disclosed subject matter the above described gas manifolds and baffle assemblies, or other like them, may be installed near the respective OPuS mirror(s) to continuously remove the warm gas away from the mirror surface and away from the beam path. The purge gas in preferred. embodiment is $N_2$. Only purged mirrors 20D and 20B, for each of the two illustrative delay paths in the pulse stretcher, in the lower housing 60 are shown, but up to all four mirrors, in each delay path, can be purged, i.e., the same or similar purging assembly may also be incorporated into the illustrative upper housing 60' containing the mirror 20A and 20C for each of the two delay paths in the illustrative pulse stretcher. The purge gas may be flowed across the reflecting surfaces of the mirror(s) in sufficient quantity and flow rate to remove the heated gas layer, e.g., which tends to be accumulating near the mirror surfaces without the presence of the purge gas flow. FIG. 7 illustrates by way of example a purging gas manifold 200, according to aspects of an embodiment of the disclosed subject matter, which purging gas manifold 200 can supply purging gas lines 202, 204 and 206, respectively to the lower tower mirror housing 60, the beam splitter housing 70 and the upper tower mirror housing 60'. The manifold 200 may be supplied with purging gas, typically nitrogen in DUV laser systems to avoid absorption of the DUV radiation, from a laser system nitrogen/other purging gas source (not shown) through a gas supply fitting 212 into a manifold distribution pipe 208. Each gas supply fitting 209 leading from the manifold pipe 208 may have the high pressure washer 158 as noted above. an elbow fitting 210 connects each manifold pipe outlet to the respective supply line 202, 204 and 206.

Figure 11:
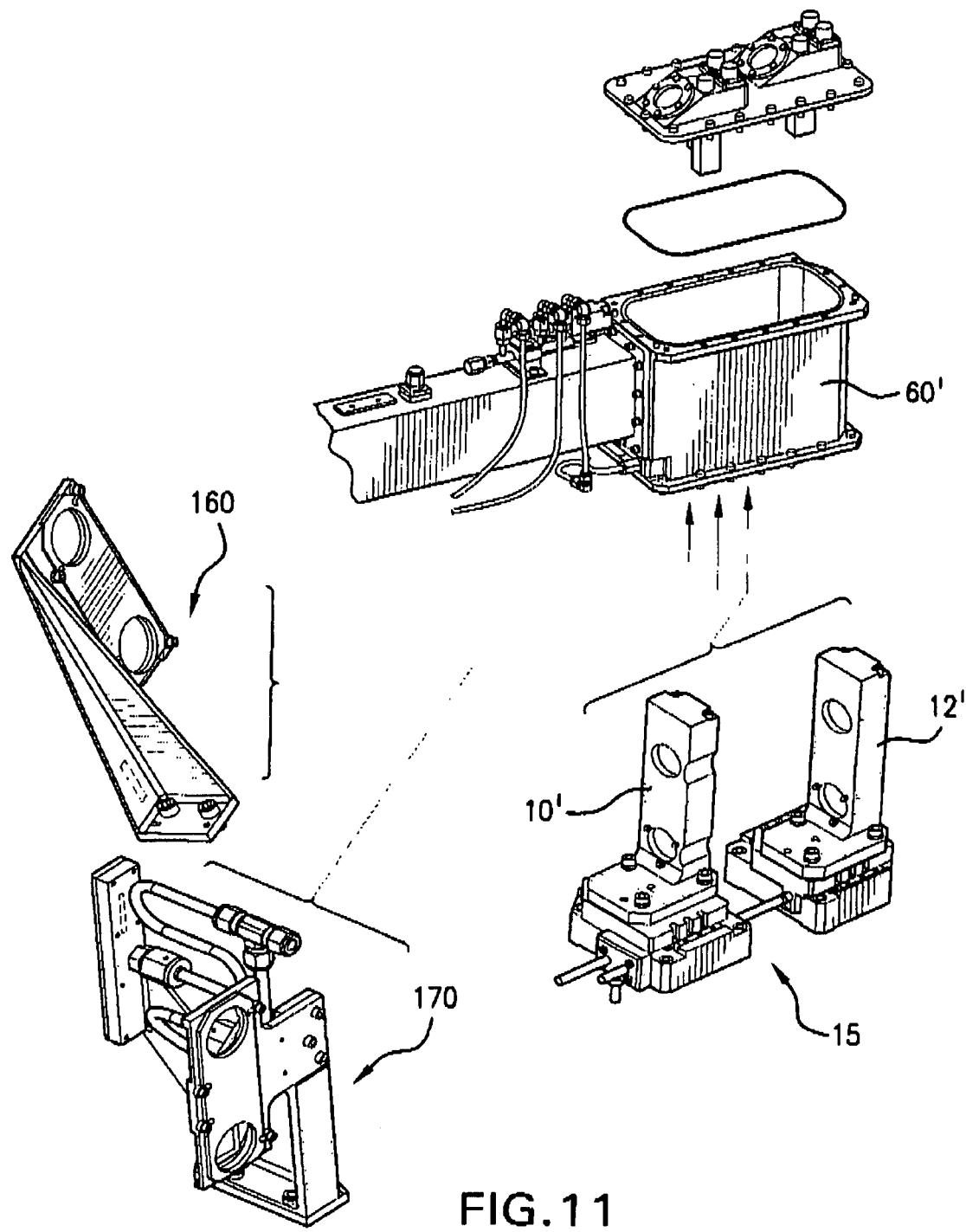
FIG. 11 shows a perspective view illustrating another aspect of an embodiment of the disclosed subject matter.

FIG. 11 shows, partly schematically and in partly exploded form a portion of a pulse stretcher according to aspects of an embodiment of the disclosed subject matter. In the portion of the pulse stretcher illustrated by way of example in FIG. 11 both the mirror position mechanism 15 and the purging gas assembly 160, 170 are shown as being assembled in the upper tower optical delay mirror housing 60'. It will be understood that this could also be done in the lower tower optical delay path mirror housing 60 and/or alternatively done only in the lower tower optical delay path mirror housing 60. Alternatively according to aspects of an embodiment of the disclosed subject matter, the optical delay path mirror position mechanism 15 may be implemented in either the housing 60 or the housing 60' and the mirror gas purging system 160, 170 implements in both of the housings 60, 60' or only in the opposite one from the one in which the mirror positioning mechanism 15 is implemented.

It will be understood by those skilled in the art that apparatus and method is disclosed which may comprise a high power excimer or molecular fluorine gas discharge laser DUV light source system, e.g., 60W or more for photolithographic process light sources and 180 watts of more for thin film annealing process light sources which may comprise: a pulse stretcher which may comprise: an optical delay line mirror, an optical delay line mirror gas purging assembly which may comprise: a purging gas supply system directing purging gas across a face of the optical delay line mirror. Such purging gas directed across the face of the optical delay path mirror may, among other things, reduce the distortion of the laser beam passing through an optical delay path in a pulse stretcher, due, e.g., to heat distortion of the mirror itself or a layer of heated purge gas (inserted to reduce absorption of the DUV light), accumulating on the mirror surface and distorting the laser beam wavefront. The optical delay line mirror may comprise a plurality of optical delay line mirrors; the purging gas supply system may direct purging gas across a face of each of the plurality of optical delay line mirrors, e.g., the plurality may be all of the mirrors in a pulse stretcher or all in an optical delay path of a pulse stretcher with multiple delay paths or all in a housing holding mirrors at one end of the pulse stretcher or at least one mirror or pair of mirrors at one end of the pulse stretcher. The purging gas supply system may comprise: a purging gas supply line; a purging gas distributing and directing mechanism which may direct purging gas across the face of the respective optical delay path mirror. The purging gas supply system may comprise: a purging gas supply line; a purging gas distribution manifold and a baffle arrangement directing purging gas across the face of the respective optical delay path mirror. The baffle may comprise a light transmitting opening exposing a respective optical delay path mirror to a light beam in the delay path. The distribution manifold may comprise: a top plate and a bottom plate forming internal channels, when joined together, or internal channels form in other ways, connecting a purging gas inlet plenum to gas manifold gas distribution openings. The apparatus and method may comprise: a mirror position adjustment mechanism adjusting the position of an optical delay path mirror to correct for errors in the alignment of the optical delay path. The mirror position adjustment mechanism may comprise: an optical delay path mirror mount moveably connected to an optical delay path housing wall for movement of the optical delay path mirror relative to the optical delay path, e.g., along the path or transverse to the path. The mirror purge gas distribution system and the mirror positioning system may be housed in the same housing at either end of the pulse stretcher, e.g., at the end of the upper tower or at the end of the lower tower, or only in one of the two such housings, upper or lower, or combinations of these, such as the positioning system in one of the upper and lower tower housing and the purge gas delay path mirror distribution system in the other, or a purge gas system in each housing(s) at the respective ends of the pulse stretcher and a positioning system only in one end of the pulse stretcher, or a positioning system in both housings and a purge gas system in only one, according to aspects of an embodiment of the disclosed subject matter.

It will be understood by those skilled in the art that the aspects of embodiments of the disclosed subject matter disclosed above are intended to be preferred embodiments only and not to limit the disclosure of the disclosed subject matter(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the disclosed subject matter(s) but also such equivalents and other modifications and changes that would be apparent to those skilled in the art. In additions to changes and modifications to the disclosed and claimed aspects of embodiments of the disclosed subject matter(s) noted above others could be implemented. For example mirror surface purging could be carried out in both housings 60 and 60' or only in one, which could be either the upper housing 60' or the lower housing 60. In addition, mirror positioning adjustments could be for only two mirrors in the respective delay path or for all four, and n the former case one mirror mounting assembly can be adjustably positioned within the upper housing 60' and one in the lower housing 60, e.g., eliminating the need for the extension through the mounting block, such as shown by shaft 90 in FIG. 5.

While the particular aspects of embodiment(s) of the HIGH POWER EXCIMER LASER WITH A PULSE STRETCHER described and illustrated in this patent application in the detail required to satisfy 35 U.S.C. § 112 is fully capable of attaining any above-described purposes for, problems to be solved by or any other reasons for or objects of the aspects of an embodiment(s) above described, it is to be understood by those skilled in the art that it is the presently described aspects of the described embodiment(s) of the disclosed subject matter are merely exemplary, illustrative and representative of the subject matter which is broadly contemplated by the disclosed subject matter. The scope of the presently described and claimed aspects of embodiments fully encompasses other embodiments which may now be or may become obvious to those skilled in the art based on the teachings of the Specification. The scope of the present HIGH POWER EXCIMER LASER WITH A PULSE STRETCHER is solely and completely limited by only the appended claims and nothing beyond the recitations of the appended claims. Reference to an element in such claims in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment to address each and every problem sought to be solved by the aspects of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. § 112, sixth paragraph, unless the element is expressly recited using the phrase "means for" or, in the case of a method claim, the element is recited as a "step" instead of an "act".

It will be understood also be those skilled in the art that, in fulfillment of the patent statutes of the United States, Applicant(s) has disclosed at least one enabling and working embodiment of each invention recited in any respective claim appended to the Specification in the present application and perhaps in some cases only one. For purposes of cutting down on patent application length and drafting time and making the present patent application more readable to the inventor(s) and others, Applicant(s) has used from time to time or throughout the present application definitive verbs (e.g., "is", "are", "does", "has", "includes" or the like) and/or other definitive verbs (e.g., "produces," "causes" "samples," "reads," "signals" or the like) and/or gerunds (e.g., "producing," "using," "taking," "keeping," "making," "determining," "measuring," "calculating" or the like), in defining an aspect/feature/element of, an action of or functionality of, and/or describing any other definition of an aspect/feature/element of an embodiment of the subject matter being disclosed. Wherever any such definitive word or phrase or the like is used to describe an aspect/feature/element of any of the one or more embodiments disclosed herein, i.e., any feature, element, system, sub-system, component, sub-component, process or algorithm step, particular material, or the like, it should be read, for purposes of interpreting the scope of the subject matter of what applicant(s) has invented, and claimed, to be preceded by one or more, or all, of the following limiting phrases, "by way of example," "for example," "as an example," "illustratively only," "by way of illustration only," etc., and/or to include any one or more, or all, of the phrases "may be," "can be", "might be," "could be" and the like. All such features, elements, steps, materials and the like should be considered to be described only as a possible aspect of the one or more disclosed embodiments and not as the sole possible implementation of any one or more aspects/features/elements of any embodiments and/or the sole possible embodiment of the subject matter of what is claimed, even if, in fulfillment of the requirements of the patent statutes, Applicant(s) has disclosed only a single enabling example of any such aspect/feature/element of an embodiment or of any embodiment of the subject matter of what is claimed. Unless expressly and specifically so stated in the present application or the prosecution of this application, that Applicant(s) believes that a particular aspect/feature/element of any disclosed embodiment or any particular disclosed embodiment of the subject matter of what is claimed, amounts to the one an only way to implement the subject matter of what is claimed or any aspect/feature/element recited in any such claim, Applicant(s) does not intend that any description of any disclosed aspect/feature/element of any disclosed embodiment of the subject matter of what is claimed in the present patent application or the entire embodiment shall be interpreted to be such one and only way to implement the subject matter of what is claimed or any aspect/feature/element thereof, and to thus limit any claim which is broad enough to cover any such disclosed implementation along with other possible implementations of the subject matter of what is claimed, to such disclosed aspect/feature/element of such disclosed embodiment or such disclosed embodiment. Applicant(s) specifically, expressly and unequivocally intends that any claim that has depending from it a dependent claim with any further detail of any aspect/feature/element, step, or the like of the subject matter of what is recited in the parent claim or claims from which it directly or indirectly depends, shall be interpreted to mean that the recitation in the parent claim(s) was broad enough to cover the further detail in the dependent claim along with other implementations and that the further detail was not the only way to implement the aspect/feature/element claimed in any such parent claim(s), and thus be limited to the further detail of any such aspect/feature/element recited in any such dependent claim to in any way limit the scope of the broader aspect/feature/element of any such parent claim, including by incorporating the further detail of the dependent claim into the parent claim.

We claim:

1. An apparatus comprising:
a high power excimer or molecular fluorine gas discharge laser DUV light source system comprising:
a pulse stretcher comprising:
an optical delay line mirror,
an optical delay line mirror gas purging assembly comprising:
a purging gas supply system directing purging gas across a face of the optical delay line mirror;
the purging gas supply system comprising:
a purging gas supply line;
a purging gas distribution manifold and a baffle arrangement directing purging gas across the face of the respective optical delay path mirror;
and wherein the baffle comprises a light transmitting opening exposing a respective optical delay path mirror to a light beam in the delay path.

2. The apparatus of claim 1 further comprising:
the optical delay line mirror comprising a plurality of optical delay line mirrors;
the purging gas supply system directing purging gas across a face of each of the plurality of optical delay line mirrors.

3. The apparatus of claim 1 further comprising:
the distribution manifold comprising:
a top plate and a bottom plate forming internal channels when joined together connecting a purging gas inlet plenum to gas manifold gas distribution openings.

4. The apparatus of claim 1 further comprising:
a mirror position adjustment mechanism adjusting the position of an optical delay path mirror to correct for errors in the alignment of the optical delay path.

5. The apparatus of claim 2 further comprising:
a mirror position adjustment mechanism adjusting the position of an optical delay path mirror to correct for errors in the alignment of the optical delay path.

6. The apparatus of claim 3 further comprising:
a mirror position adjustment mechanism adjusting the position of an optical delay path mirror to correct for errors in the alignment of the optical delay path.

7. The apparatus of claim 4 further comprising:
the mirror position adjustment mechanism comprising:
an optical delay path mirror mount moveably connected to an optical delay path housing wall for movement of the optical delay path mirror relative to the optical delay path.

8. The apparatus of claim 5 further comprising:
the mirror position adjustment mechanism comprising:
an optical delay path mirror mount moveably connected to an optical delay path housing wall for movement of the optical delay path mirror relative to the optical delay path.

9. The apparatus of claim 6 further comprising:
the mirror position adjustment mechanism comprising:
an optical delay path mirror mount moveably connected to an optical delay path housing wall for movement of the optical delay path mirror relative to the optical delay path.

* * * * *